United States Patent [19]

Chen

[11] Patent Number: 5,492,392
[45] Date of Patent: Feb. 20, 1996

[54] DERAILLEUR GUARD

[76] Inventor: Ava Chen, 4F, No. 24, Alley 10, Lane 142, Chung-Hsueh Rd., Tainan City, Taiwan

[21] Appl. No.: 431,448

[22] Filed: May 1, 1995

[51] Int. Cl.⁶ .................................................. B60B 7/08
[52] U.S. Cl. ................................. 301/37.41; 301/108.1
[58] Field of Search .......................... 301/37.1, 37.41, 301/108.1; 280/288.4, 304.3, 259; D12/127

[56] References Cited

U.S. PATENT DOCUMENTS

| | | | |
|---|---|---|---|
| 1,861,278 | 5/1932 | Kuniholm | 301/108.1 |
| 1,878,528 | 9/1932 | Kraeft | 301/37.41 X |
| 3,034,833 | 5/1962 | Ares | 301/37.41 |
| 3,317,246 | 5/1967 | Wester | 301/37.41 |
| 4,278,265 | 7/1981 | Nagano | 280/304.3 X |

*Primary Examiner*—Russell D. Stormer
*Attorney, Agent, or Firm*—Knobbe, Martens, Olson & Bear

[57] ABSTRACT

A derailleur guard is to be incorporated in a bicycle wheel with a rim, a central hub, a plurality of spokes having first ends connected to the rim and second ends connected to the hub, and a sprocket cluster mounted on one end portion of the hub. The derailleur guard is to be disposed around the hub between the spokes and the sprocket cluster and includes at least two guard plates which are formed as annular segments that cooperatively constitute an annular unit with a central through-hole for extension of the hub therethrough. Each of the guard plates has an inner face formed with a plurality of angularly displaced clip units that are adapted to engage removably some of the spokes of the bicycle wheel.

7 Claims, 10 Drawing Sheets

DERAILLEUR GUARD

BACKGROUND OF THE INVENTION

1. Field of the Invention

The invention relates to a derailleur guard, more particularly to a derailleur guard which can be easily assembled and disassembled from a bicycle wheel without the need for removing a sprocket cluster of the latter.

2. Description of the Related Art

Referring to FIGS. 1 and 3, a conventional rear bicycle wheel is shown to comprise a rim 11, a tire 10 mounted on the rim 11, a central hub 13 provided with a pair of annular radial flanges 130, and a plurality of spokes 12, each of which has a first end connected to the rim 11 and a second end connected to one of the radial flanges 130. A commercially available rear bicycle wheel usually has 32 or 36 spokes. A sprocket cluster 14 is mounted on one end portion of the hub 13 for engaging a bicycle drive chain (not shown). An annular derailleur guard 15 is mounted on the hub 13 and is disposed between the spokes 12 and the sprocket cluster 14.

Referring to FIG. 2, the derailleur guard 15 is formed with a central through-hole 150 that permits extension of the hub 13 therethrough. The derailleur guard 15 further has an inner face which is formed with a plurality of hook units 151. The hook units 151 are equally displaced around the periphery of the through-hole 150 and engage the outer periphery of one of the radial flanges 130 to mount the derailleur guard 15 on the hub 13, as shown in FIG. 3.

The main purpose of the derailleur guard 15 is to prevent the bicycle drive chain from falling into a clearance formed between a largest sprocket of the sprocket cluster 14 and the spokes 12 due to improper operation of the rear derailleur in order to avoid jamming of the rear bicycle wheel which can endanger the user. Thus, according to regulations issued by the American Consumer Products Safety Commission, bicycles which do not incorporate a derailleur guard cannot be exported to the United States. However, bicycles which are not manufactured in the United States are seldom provided with a derailleur guard or usually incorporate a derailleur guard that lacks aesthetic appeal, thereby necessitating the installation of a new derailleur guard.

It is noted that the sprocket cluster must be removed from the hub prior to installation of the conventional derailleur guard, thereby resulting in a great deal of inconvenience. In addition, removal of the sprocket cluster cannot be performed without the use of special tools. Thus, the user is unable to replace the derailleur guard when the latter is damaged or does not appeal to the user.

SUMMARY OF THE INVENTION

The main object of the present invention is to provide a derailleur guard which can be easily assembled and disassembled from a bicycle wheel without the need for removing a sprocket cluster of the latter.

Another object of the present invention is to provide a derailleur guard which can be installed in a standard bicycle wheel with 32 or 36 spokes.

Accordingly, the derailleur guard of the present invention is to be installed in a bicycle wheel with a rim, a central hub, a plurality of spokes having first ends connected to the rim and second ends connected to the hub, and a sprocket cluster mounted on one end portion of the hub. The derailleur guard is to be disposed around the hub between the spokes and the sprocket cluster, and comprises at least two guard plates which are formed as annular segments that cooperatively constitute an annular unit with a central through-hole for extension of the hub therethrough. Each of the guard plates has an inner face formed with a plurality of angularly displaced clip units that are adapted to engage removably some of the spokes of the bicycle wheel.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
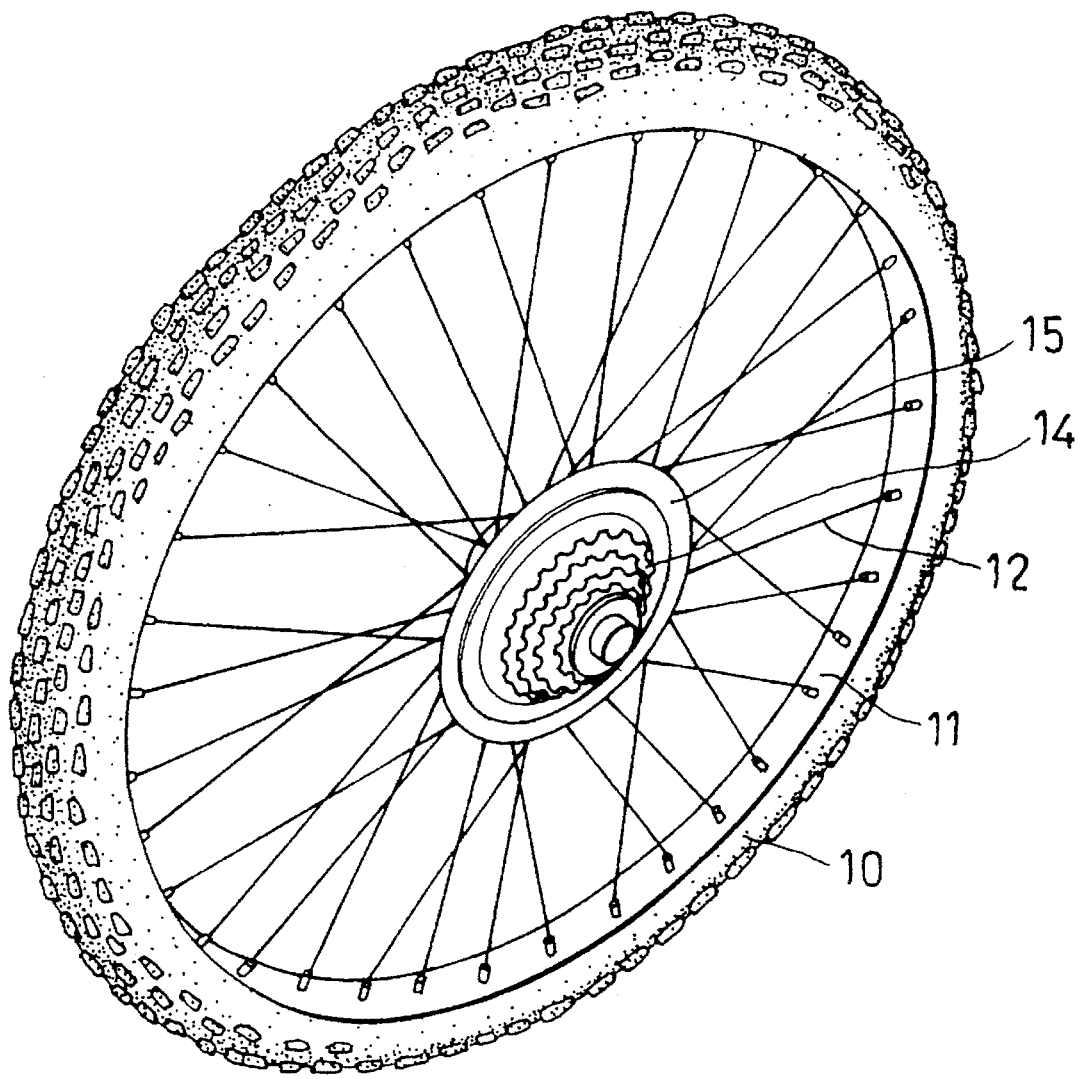
FIG. 1 is a perspective view of a conventional rear bicycle wheel.
Figure 2:
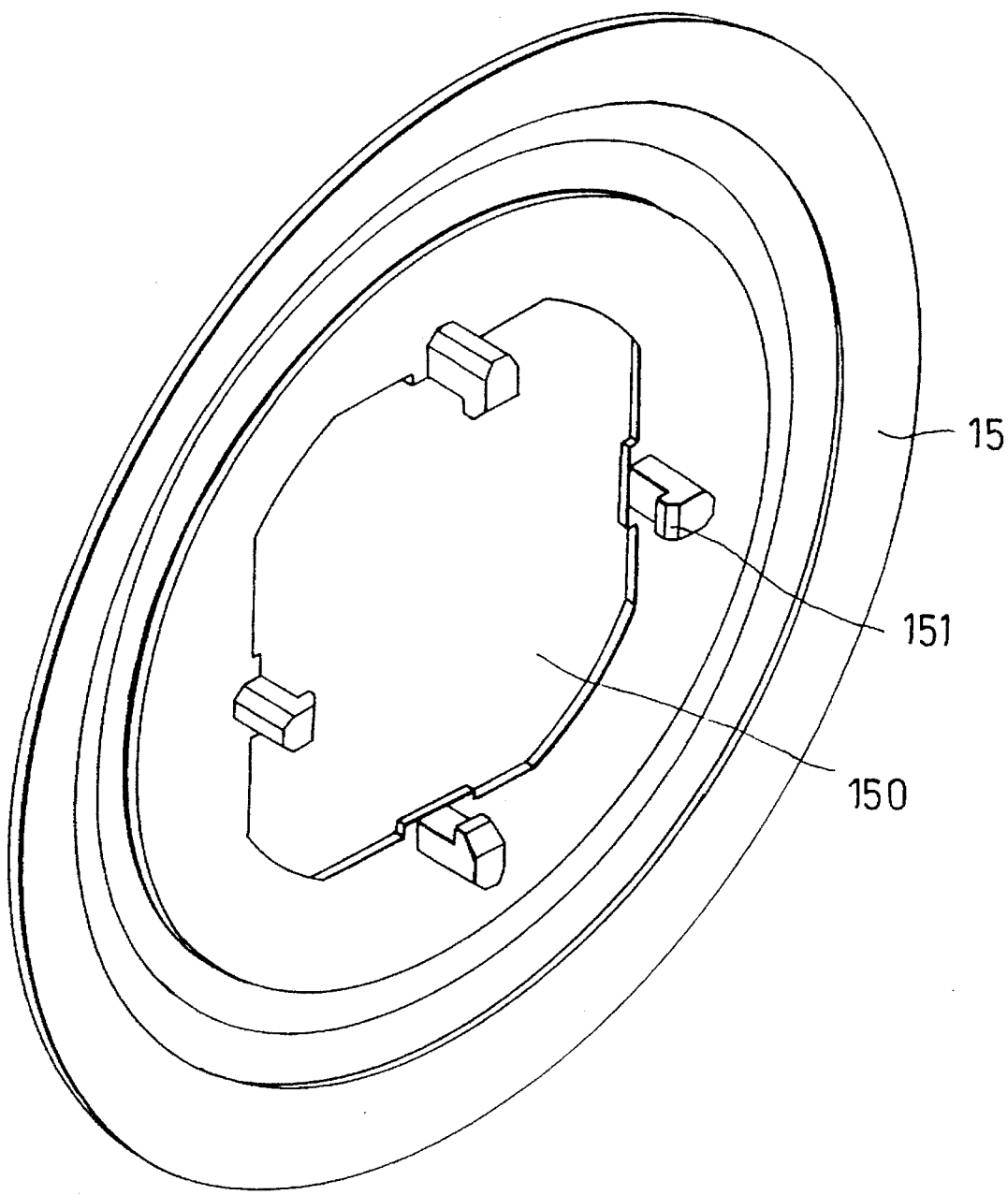
FIG. 2 is a rear perspective view of a conventional derailleur guard for a rear bicycle wheel.
Figure 3:
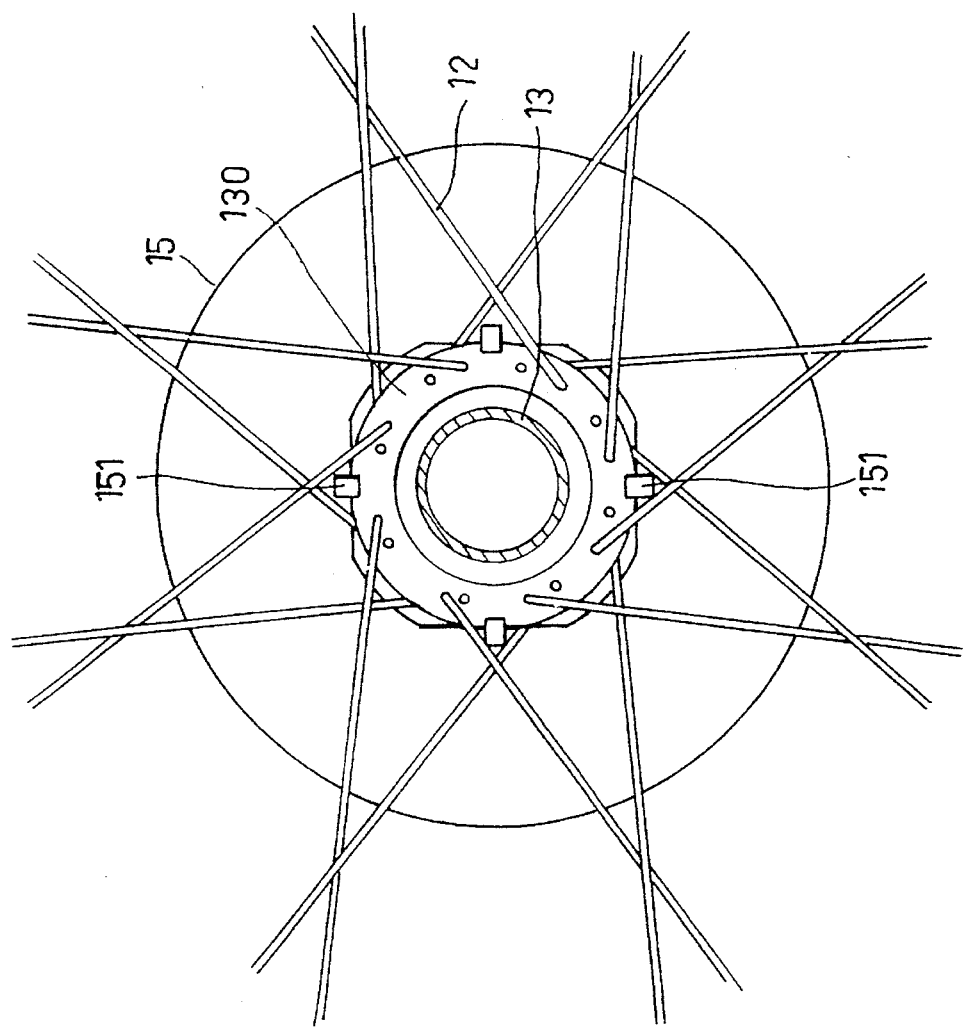
FIG. 3 is a schematic view which illustrates how the conventional derailleur guard is mounted on a rear bicycle wheel.
Figure 4:
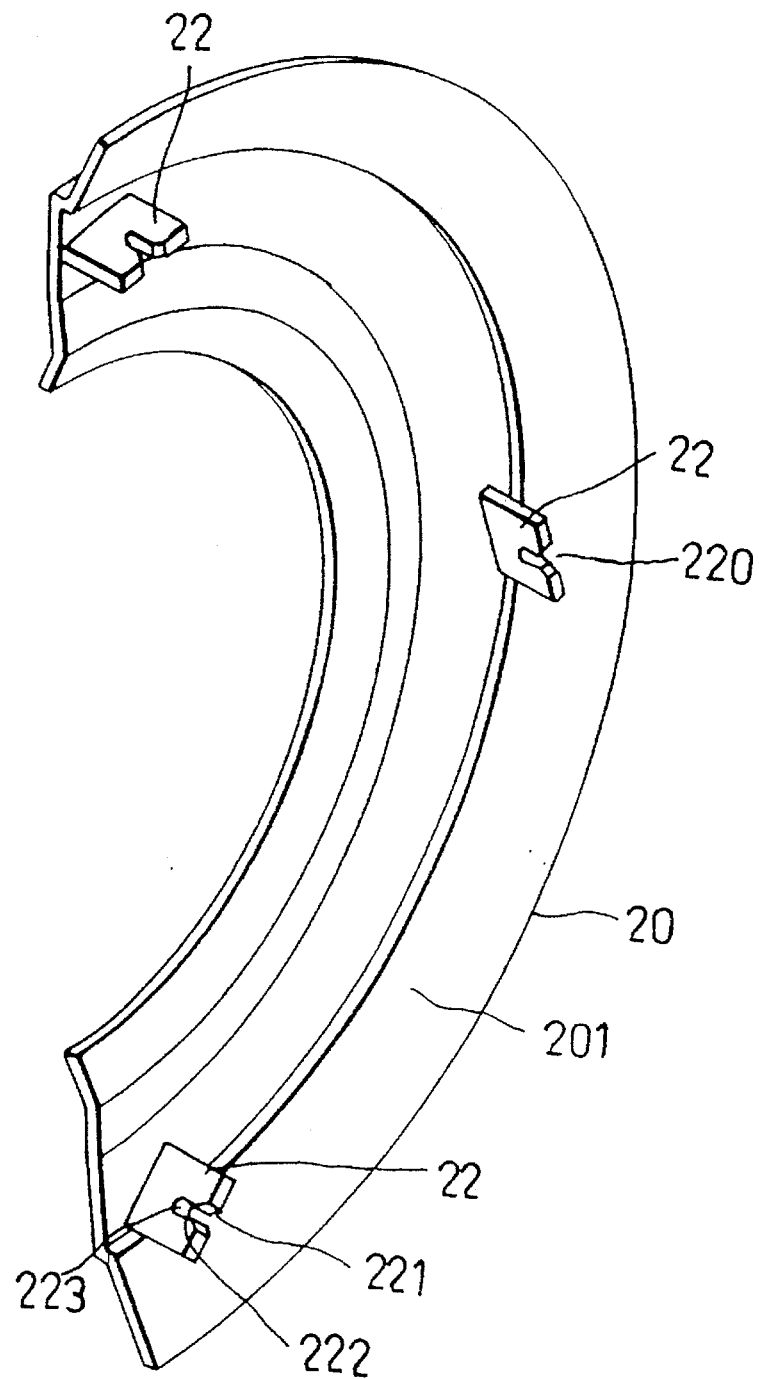
FIG. 4 is a rear perspective view of a guard plate of the first preferred embodiment of a derailleur guard according to the present invention.
Figure 5:
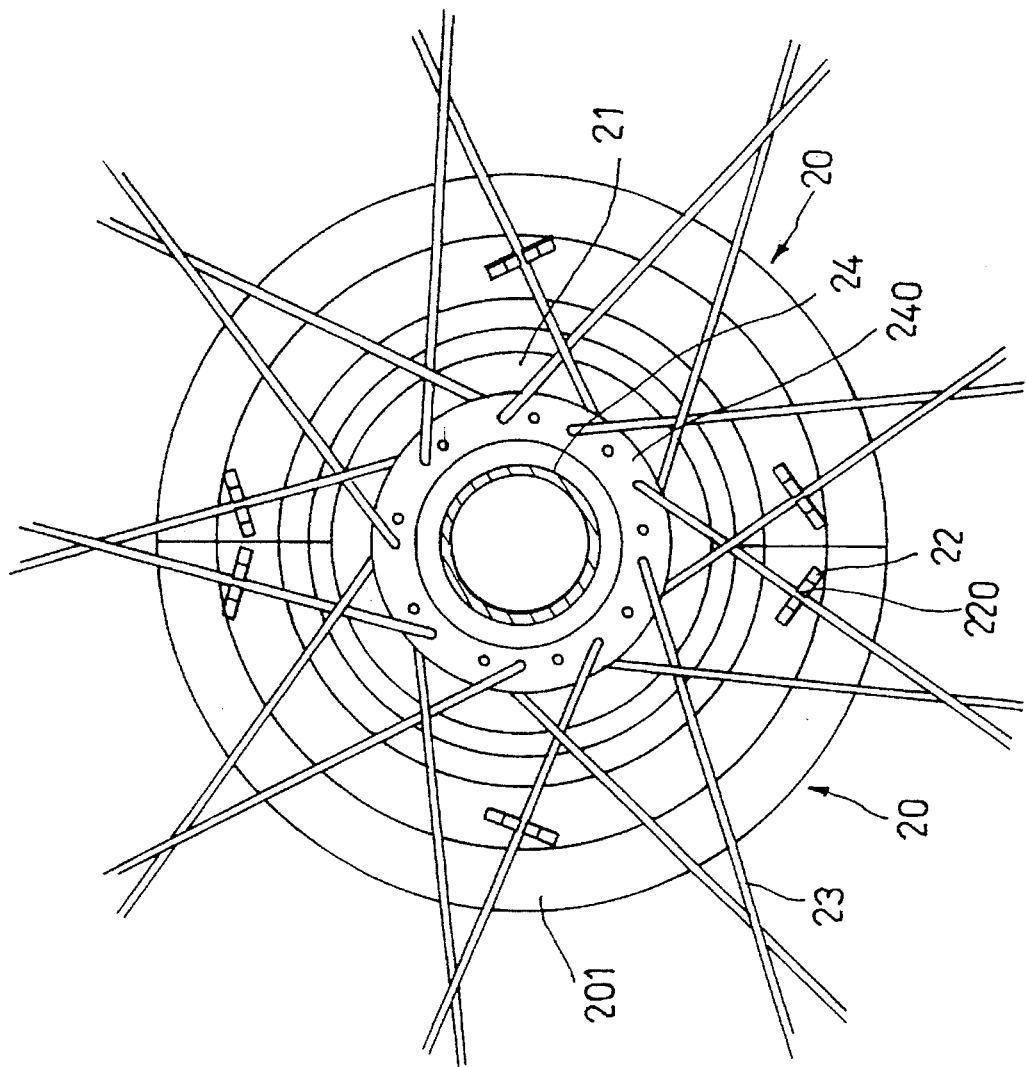
FIG. 5 is a schematic view which illustrates how the first preferred embodiment is mounted on a rear bicycle wheel.

Referring to FIGS. 4 and 5, the first preferred embodiment of a derailleur guard according to the present invention is shown to comprise two semi-annular guard plates 20 which are identical in construction (only one guard plate 20 is shown in FIG. 4). The guard plates 20 cooperatively form an annular unit with a central through-hole 21 that permits extension of a hub 24 of a rear bicycle wheel therethrough. Each of the guard plates 20 has an inner face 201 which is formed with three angularly displaced clip units 22 for engaging removably three spokes 23 of a standard 36-spoke rear bicycle wheel.

Each clip unit 22 projects transversely from the inner face 201 of the corresponding guard plate 20 and is formed with a longitudinally extending slit 220 that opens at a distal end of the clip unit 22 opposite to the corresponding guard plate 20. The slit 220 has a diverging outermost section 221, a constricted intermediate section 222 and an innermost section 223. The outermost section 221 serves as a guide section to facilitate entry of one of the spokes 23 into the slit 220, the innermost section 223 serves to receive the spoke 23 therein, and the intermediate section 222 serves to prevent untimely removal of the spoke 23 from the slit 220.

If the sprocket cluster (not shown) has not yet been installed on the hub 24, the guard plates 20 can be easily secured to the rear bicycle wheel by pressing the guard plates 20 toward the spokes 23 so as to enable the clip units 22 on the guard plates 20 to engage removably the spokes 23. The guard plates 20 form an annular unit around the hub 24 and serve to separate the spokes 23 from the sprocket cluster.

If the sprocket cluster is already installed on the rear bicycle wheel, there is no need to remove the sprocket cluster prior to installation of the derailleur guard of this invention. The guard plates 20 are secured to the rear bicycle wheel by moving the former in a planar direction of the spokes 23 so as to extend into the clearance formed between the sprocket cluster and one of the radial flanges 240 on the hub 24, and then by pressing the guard plates 20 toward the spokes 23 so as to enable the clip units 22 on the guard plates 20 to engage removably the spokes 23. The guard plates 20 are removed from the rear bicycle wheel by simply pulling the latter from the spokes 23 to cause disengagement of the clip units 22 from the spokes 23.

In this embodiment, the outer face of each guard plate 20 may be provided with spoke-like patterns. Thus, when mounting the guard plates 20 onto the spokes 23, the guard plates 20 are oriented such that the spoke-like patterns thereon match the spokes 23 of the rear bicycle wheel before pressing the guard plates 20 toward the spokes 23 to facilitate proper mounting of the derailleur guard of this invention on the rear bicycle wheel.

Figure 6:
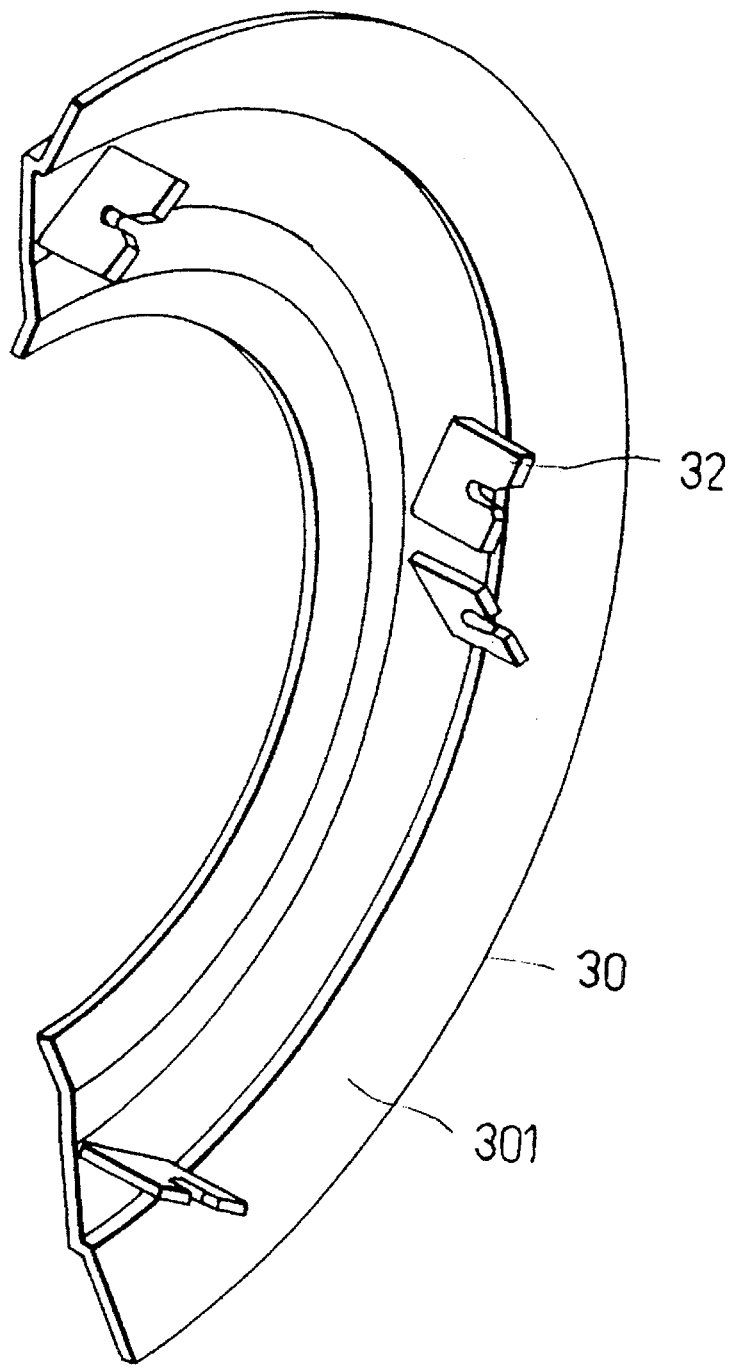
FIG. 6 is a rear perspective view of a guard plate of the second preferred embodiment of a derailleur guard according to the present invention.
Figure 7:
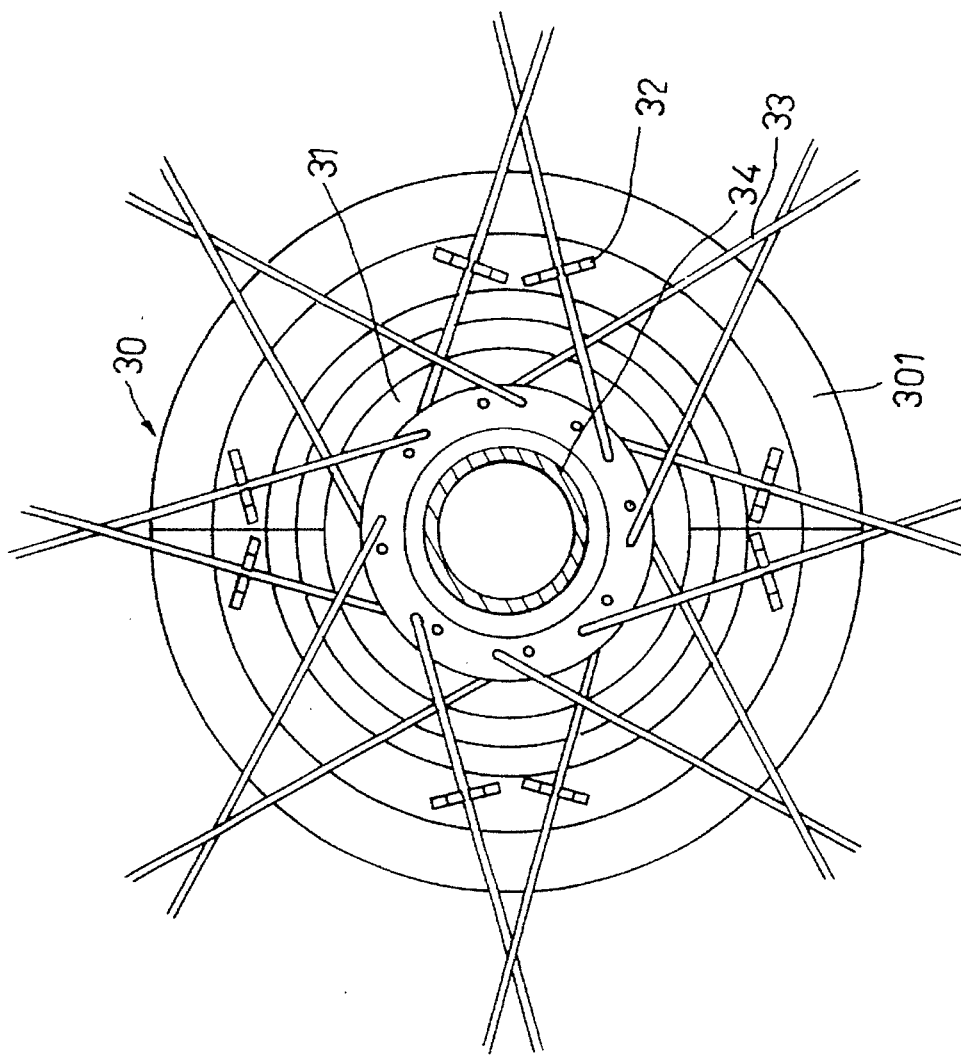
FIG. 7 is a schematic view which illustrates how the second preferred embodiment is mounted on a rear bicycle wheel.

Referring to FIGS. 6 and 7, the second preferred embodiment of a derailleur guard according to the present invention is shown to comprise two semi-annular guard plates 30 which are identical in construction (only one guard plate 30 is shown in FIG. 6). The guard plates 30 cooperatively form an annular unit with a central through-hole 31 that permits extension of a hub 34 of a rear bicycle wheel therethrough. Each of the guard plates 30 has an inner face 301 which is formed with four angularly displaced clip units 32 for engaging four spokes 33 of a standard 32-spoke rear bicycle wheel. The clip units 32 are similar to the clip units 22 of the previous embodiment and will not be described further. In addition, installation and removal of the derailleur guard of this embodiment are similar to those of the previous embodiment.

Figure 8:
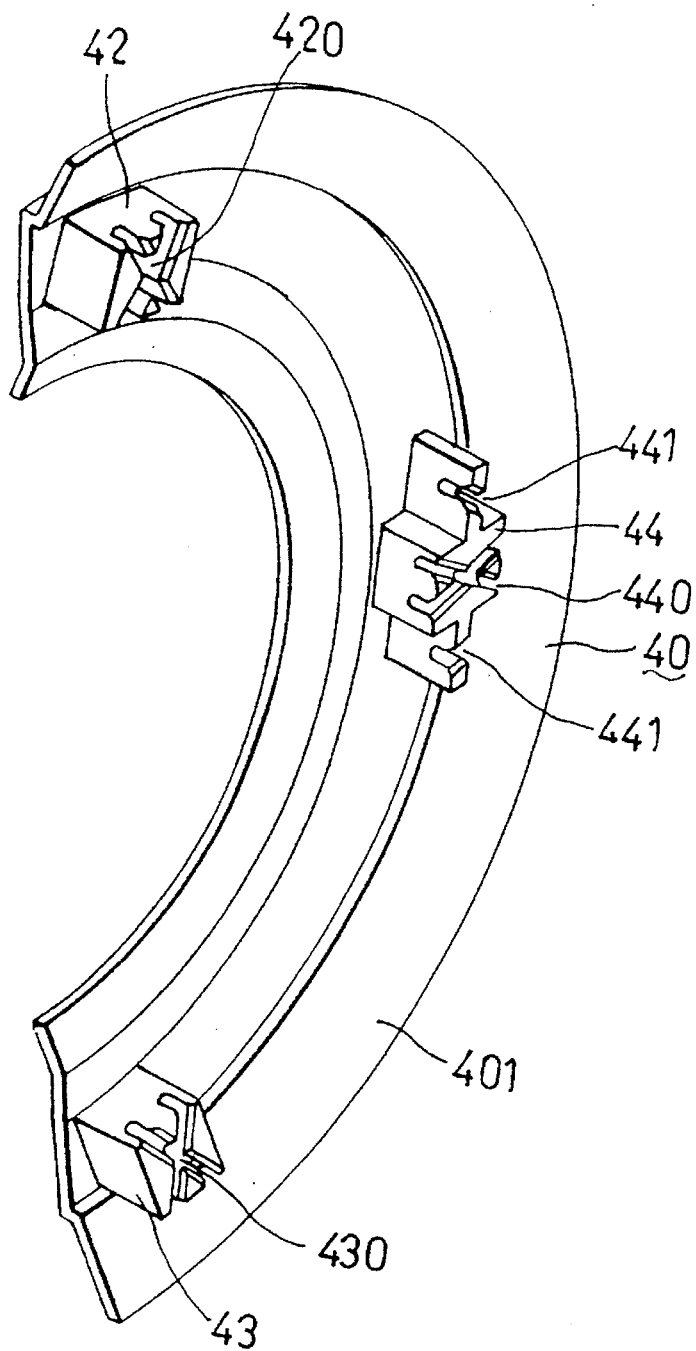
FIG. 8 is a rear perspective view of a guard plate of the third preferred embodiment of a derailleur guard according to the present invention.
Figure 9:
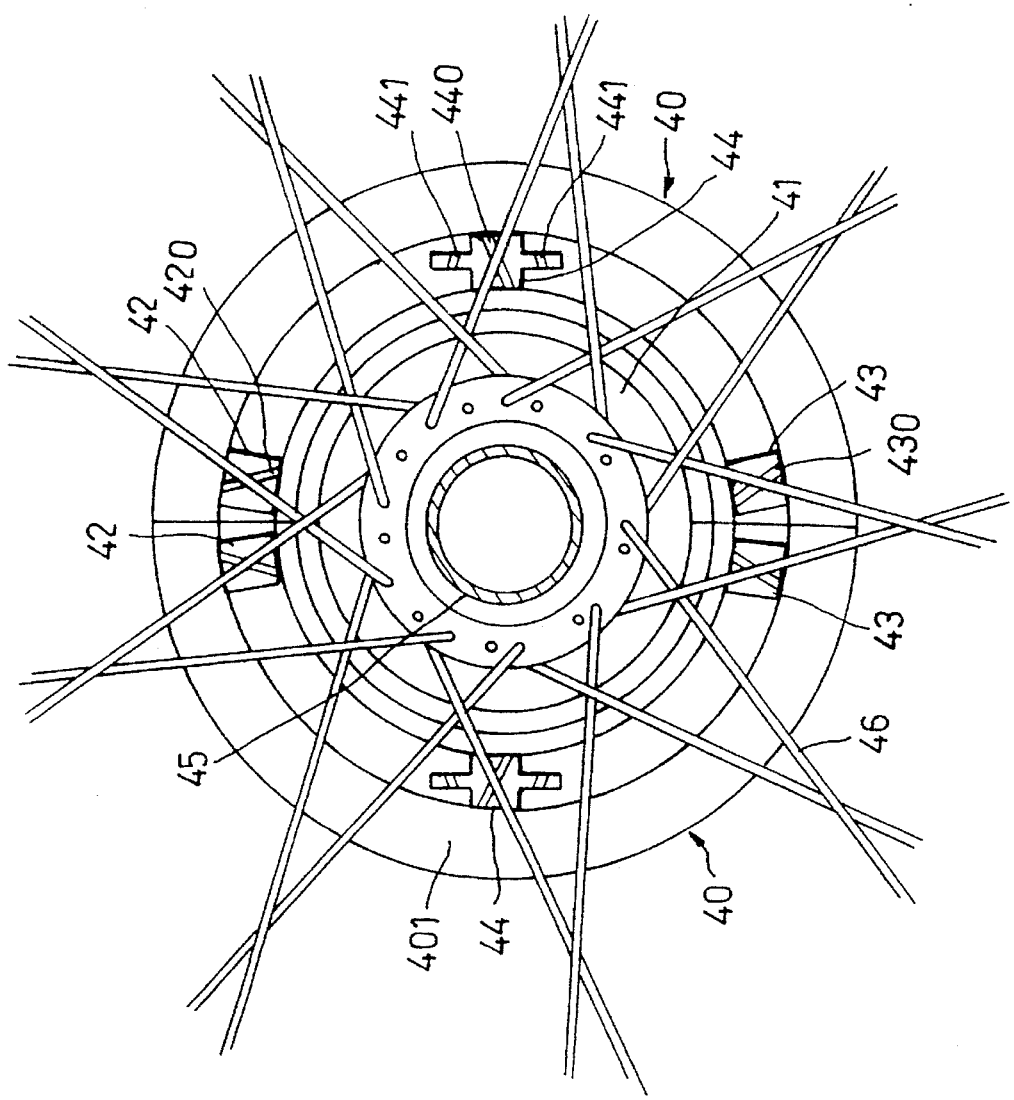
FIG. 9 is a schematic view which illustrates how the third preferred embodiment is mounted on a standard 36-spoke rear bicycle wheel.

Referring to FIGS. 8 and 9, the third preferred embodiment of a derailleur guard according to the present invention is shown to comprise two semi-annular guard plates 40 which are identical in construction (only one guard plate 40 is shown in FIG. 8). The guard plates 40 cooperatively form an annular unit with a central through-hole 41 that permits extension of a hub 45 of a rear bicycle wheel therethrough. Each of the guard plates 40 has an inner face 401 which is formed with angularly displaced first, second and third clip units 42, 43, 44.

Figure 10:
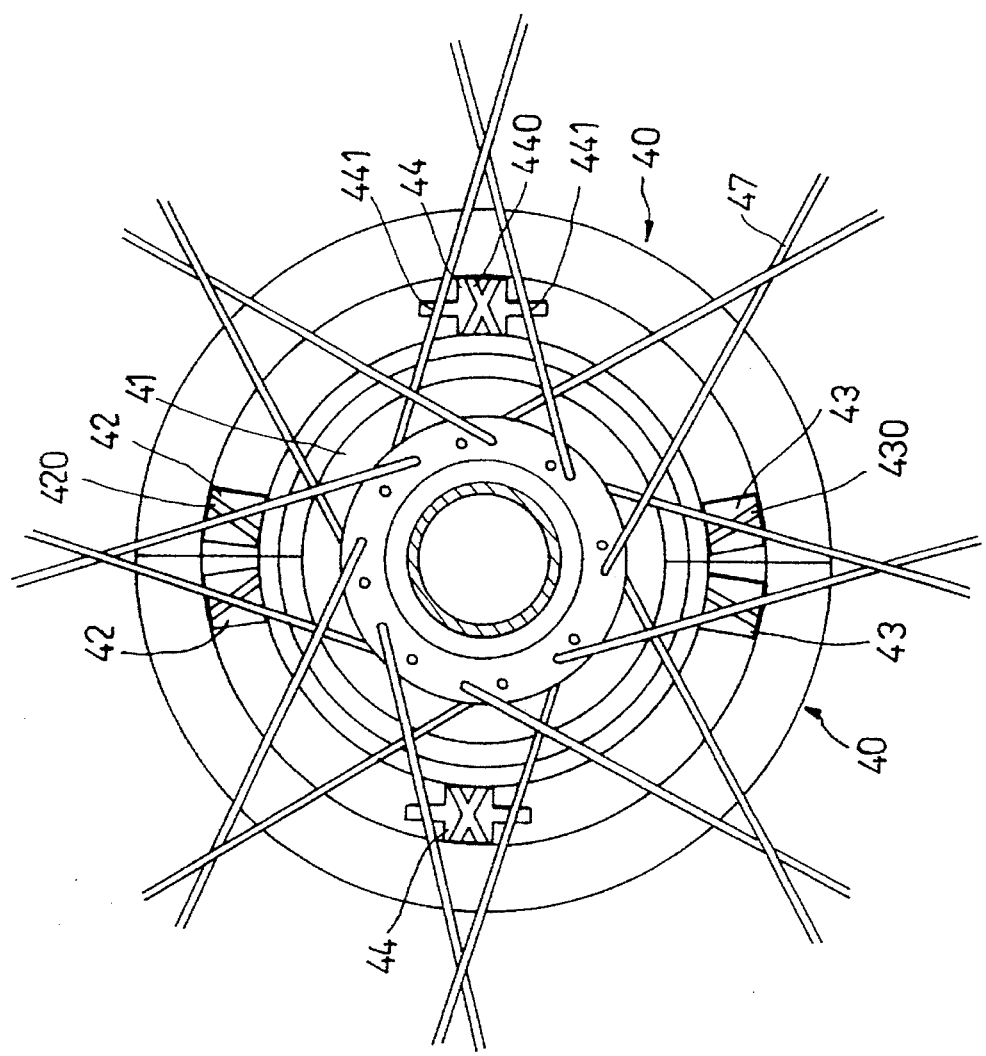
FIG. 10 is a schematic view which illustrates how the third preferred embodiment is mounted on a standard 32-spoke rear bicycle wheel.

The first and second clip units 42, 43 project transversely and respectively from the inner face 401 of a corresponding guard plate 40 adjacent to two ends of the latter. Each of the first and second clip units 42, 43 is formed with a longitudinally extending slit 420, 430 that has a cross-shaped cross-section and that opens at a distal end of the first and second clip units 42, 43 opposite to the corresponding guard plate 40. The first and second clip units 42, 43 are capable of engaging two of the spokes 46 of a standard 36-spoke rear bicycle wheel) as shown in FIG. 9, and two of the spokes 47 of a standard 32-spoke rear bicycle wheel, as shown in FIG. 10.

The third clip unit 44 similarly projects transversely from the inner face 401 of a corresponding guard plate 40 but is disposed between the first and second clip units 42, 43. The third clip unit 44 is formed with an inner longitudinally extending slit 440 that has a cross-shaped cross-section, and two outer longitudinally extending slits 441 that are disposed respectively on two sides of the inner longitudinally extending slit 440. The inner and outer longitudinally extending slits 440, 441 open at a distal end of the third clip unit 44 opposite to the corresponding guard plate 40. The inner longitudinally extending slit 440 is capable of engaging one of the spokes 46 of the standard 36-spoke rear bicycle wheel, as shown in FIG. 9, while the outer longitudinally extending slits 441 are capable of engaging two of the spokes 47 of the standard 32-spoke rear bicycle wheel, as shown in FIG. 10.

It should be noted that the derailleur guard of this invention may be constituted by more than two identical guard plates, as long as the latter are formed as annular segments that can cooperatively constitute an annular unit similar to those of the disclosed embodiments.

It has thus been shown that the derailleur guard of this invention can be easily assembled and disassembled from a bicycle wheel without the need for removing a sprocket cluster of the latter, thereby enabling the user to replace the derailleur guard when the latter is damaged or does not appeal to the user. In addition, the third preferred embodiment of this invention can be installed in a standard bicycle wheel with 32 or 36 spokes. The objects of this invention are thus attained.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A derailleur guard for a bicycle wheel with a rim, a central hub, a plurality of spokes having first ends connected to the rim and second ends connected to the hub, and a sprocket cluster mounted on one end portion of the hub, said derailleur guard to be disposed around the hub between the spokes and the sprocket cluster and comprising at least two guard plates which are formed as semi annular segments that cooperatively constitute an annular unit with a central through-hole for extension of the hub therethrough, each of said guard plates having an inner face formed with a plurality of angularly displaced clip units that are adapted to engage removably some of the spokes of the bicycle wheel.

2. A derailleur guard for a bicycle wheel with a rim, a central hub, a plurality of spokes having first ends connected to the rim and second ends connected to the hub, and a sprocket cluster mounted on one end portion of the hub, said derailleur guard to be disposed around the hub between the spokes and the sprocket cluster and comprising two semi-annular guard plates which cooperatively form an annular unit with a central through-hole for extension of the hub therethrough, each of said guard plates having an inner face formed with a plurality of angularly displaced clip units that are adapted to engage removably some of the spokes of the bicycle wheel.

3. The derailleur guard as claimed in claim 2, wherein each of said clip units projects transversely from said inner face of a corresponding one of said guard plates and is formed with a longitudinally extending slit that opens at a distal end of said clip unit opposite to the corresponding one of said guard plates.

4. The derailleur guard as claimed in claim 3, wherein said slit has a diverging outermost section, a constricted intermediate section and an innermost section, said outermost section serving as a guide section which is adapted to facilitate entry of one of the spokes of the bicycle wheel into said slit, said innermost section being adapted to receive said one of the spokes of the bicycle wheel therein, and said intermediate section being adapted to prevent untimely removal of said one of the spokes of the bicycle wheel from said slit.

5. The derailleur guard as claimed in claim 2, wherein each of said guard plates has three of said clip units that are adapted to engage removably three of the spokes of a standard 36-spoke bicycle wheel.

6. The derailleur guard as claimed in claim 2, wherein each of said guard plates has four of said clip units that are adapted to engage removably four of the spokes of a standard 32-spoke bicycle wheel.

7. The derailleur guard as claimed in claim 2, wherein:

said clip units on each of said guard plates include first, second and third clip units;

said first and second clip units projecting transversely and respectively from said inner face of a corresponding one of said guard plates adjacent to two ends of the corresponding one of said guard plates, each of said first and second clip units being formed with a longitudinally extending slit that has a cross-shaped cross-section and that opens at a distal end of said first and second clip units opposite to the corresponding one of said guard plates, said first and second clip units being adapted to engage removably two of the spokes of the bicycle wheel regardless of whether the bicycle wheel is a standard 36-spoke bicycle wheel or a standard 32-spoke bicycle wheel;

said third clip unit similarly projecting transversely from said inner face of a corresponding one of said guard plates and being disposed between said first and second clip units on the corresponding one of said guard plates, said third clip unit being formed with an inner longitudinally extending slit that has a cross-shaped cross-section, and two outer longitudinally extending slits that are disposed respectively on two sides of said inner longitudinally extending slit, said inner and outer longitudinally extending slits opening at a distal end of said third clip unit opposite to the corresponding one of said guard plates, said inner longitudinally extending slit being adapted to engage removably one of the spokes of the bicycle wheel if the bicycle wheel is the standard 36-spoke bicycle wheel, and said outer longitudinally extending slits being adapted to engage removably two of the spokes of the bicycle wheel if the bicycle wheel is the standard 32-spoke bicycle wheel.

* * * * *